Nov. 17, 1953
R. J. WELSH
2,659,448
SEPARATOR FOR IMPURITIES PRESENT IN THE COMBUSTION
PRODUCTS OF GAS TURBINE PLANTS
Filed Aug. 2, 1950
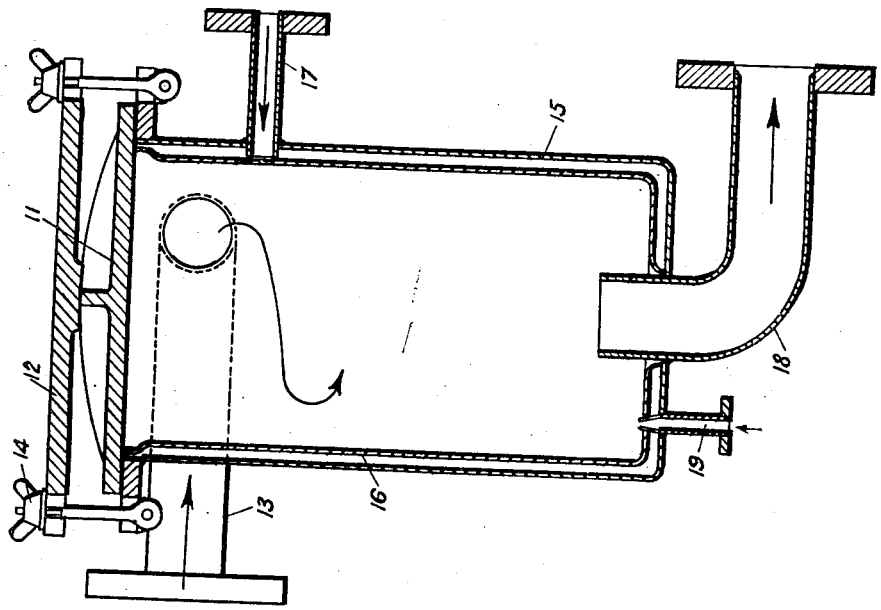
INVENTOR:
ROBERT J. WELSH
By *Babcock & Babcock*
ATTORNEYS Patented Nov. 17, 1953

2,659,448

UNITED STATES PATENT OFFICE 2,659,448

SEPARATOR FOR IMPURITIES PRESENT IN THE COMBUSTION PRODUCTS OF GAS TURBINE PLANTS

Robert James Welsh, Rugby, England

Application August 2, 1950, Serial No. 177,295

Claims priority, application Great Britain April 29, 1948

3 Claims. (Cl. 183—5)

This invention relates to separators for the removal of impurities contained in the combustion products of a gas turbine plant which at the temperature prevailing in the combustion chamber of such plant are present in the form of gas, vapour or smoke only, but upon cooling the said combustion products below the dew point of such impurities may form sticky liquids or solids.

If such layers are formed on the blading of the gas turbine in the stage where the temperature falls below said dew point owing to the expansion of the combustion products, the efficiency of the gas turbine may be seriously affected, particularly if solid ashes stick to the liquid layers of condensed impurities and spoil the aerodynamic profile of said blading.

My co-pending patent applications Ser. No. 88,140, of April 18, 1949, now Patent No. 2,608,055, issued August 26, 1952, and Ser. No. 177,294, of August 2, 1950, are concerned with a gas turbine plant comprising a separator for the removal of the aforesaid impurities from the combustion products in a zone distinct from the blading and from the combustion chamber of the gas turbine. The present invention relates to the separator as such.

It is an object of the invention to provide a separator having a chamber wherein liquid condensate impurities and solid ash particles are collected.

It is another object of the invention to provide a separator having a chamber which is readily accessible for cleaning purposes.

Other objects of the invention will become apparent from the following description of an embodiment thereof given merely by way of example and with reference to the accompanying drawing, which shows a sectional elevation of a separator according to the invention.

The vessel 15 is provided with a lid 11 which can be tightly clamped to the vessel 15 by means of hinged bolts and wing nuts 14 and a cross member 12 and which can be readily removed by unscrewing these nuts. Combustion gases enter the chamber 15 through an inlet conduit 13 with a tangential component, and swirl around within the said chamber 15 which serves as a vortex chamber wherein impurities are separated by centrifugal force from the gas stream. The combustion gases leave the chamber 15 through outlet conduit 18.

In order to cool the impurities contained in the combustion gases below dew point, compressed air of the appropriate pressure is introduced into the chamber 15 through an inlet conduit 17, and a spray of sea water may be injected if desired through the nozzle 19.

The position of the pipe connections 13, 17, 18 and 19 and the shape or orientation of said chamber may be changed according to local requirements, but care should be taken that no pipe connection interferes with the withdrawal of a renewable inner lining 16 from the chamber 15. This withdrawal may be effected when the plant is out of operation by removing the cover 11 and withdrawing the lining 16 through the opening of chamber 15. This lining 16 may be of cheap material and construction so that it may be discarded and replaced by a fresh lining in the event of the deposits being of a nature which makes it difficult to remove them from its surface.

A suitable form of connection for the inlet conduit 17 is shown in the drawing, where said inlet conduit is extended in the lining 16 but stops just short of its wall so as not to hamper its withdrawal from the chamber 15.

While I have described and illustrated what I consider suitable embodiments of my invention, I wish it to be understood that I do not limit myself to the exact construction and dimensions shown, for obvious modifications will occur to a person skilled in the art.

What I claim as my invention and desire to secure by Letters Patent is:

1. A separator for the separation of impurities present in the combustion products of a gas turbine plant as gases, vapours or smokes but liable to form liquid or solid deposits when cooled, comprising a chamber enlarged for allowing the combustion gases to pass through it at a reduced velocity, a detachable liner arranged inside the said chamber, a large access door to the said chamber arranged for the insertion of the said liner into and its withdrawal from the said chamber, a lateral inlet for the combustion gases into the said liner, arranged near the upper end thereof, an outlet for the combustion gases from the interior of the said liner arranged at the lower end thereof, and a lateral inlet for a gaseous cooling medium to be admixed to the combustion gases within the said liner.

2. A separator for the separation of impurities present in the combustion products of a gas turbine plant as gases, vapours or smokes but liable to form liquid or solid deposits when cooled comprising a chamber enlarged for allowing the combustion gases to pass through it at a reduced velocity, a lateral inlet for the combustion gases into the said chamber near its upper end, an outlet for these gases from the said chamber at its lower end, a lateral inlet for gaseous cooling medium to be admixed to the combustion gases, and an inlet for a liquid cooling medium to be admixed to the said combustion gases inside the said chamber.

3. A separator for the separation of impurities present in the combustion products of a gas turbine plant as gases, vapours or smokes but liable to form liquid or solid deposits when cooled, comprising a chamber enlarged for allowing the combustion gases to pass through it at a reduced velocity, a detachable liner arranged inside the said chamber, a large access door to the said chamber arranged for the insertion of the said liner into and its withdrawal from the said chamber, a lateral inlet for the combustion gases into the interior of the said liner arranged near the upper end thereof, an outlet for the combustion gases from the interior of the said liner arranged at the lower end thereof, and a lateral inlet for a gaseous cooling medium to be admixed to the combustion gases within the said liner, the said inlets projecting through the walls of the said chamber and stopping flush with the openings in the said liner but not engaging the said openings in a way to hinder the removal of the said liner from the said chamber.

ROBERT JAMES WELSH.

References Cited in the file of this patent

UNITED STATES PATENTS

| Number | Name | Date |
|---|---|---|
| 516,674 | Butterfield | Mar. 20, 1894 |
| 597,660 | Sergeant | Jan. 13, 1898 |
| 725,352 | McAleer | Apr. 14, 1903 |
| 875,175 | Hess | Dec. 31, 1907 |
| 880,747 | Morby | Mar. 3, 1908 |
| 1,909,227 | Shadle | May 16, 1933 |
| 2,519,028 | Dodge | Aug. 15, 1950 |

FOREIGN PATENTS

| Number | Country | Date |
|---|---|---|
| 9,911 | Great Britain | July 7, 1915 |